United States Patent
Park et al.

(10) Patent No.: US 8,060,155 B2
(45) Date of Patent: Nov. 15, 2011

(54) PORT COVER OPENING/CLOSING DEVICE FOR PORTABLE TERMINAL

(75) Inventors: Jun-Sang Park, Anyang-si (KR); Joon-Suh Kim, Anyang-si (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 965 days.

(21) Appl. No.: 11/953,514

(22) Filed: Dec. 10, 2007

(65) Prior Publication Data
US 2008/0139258 A1    Jun. 12, 2008

(30) Foreign Application Priority Data
Dec. 8, 2006    (KR) .................. 10-2006-0124682

(51) Int. Cl.
*H04M 1/00*    (2006.01)
(52) U.S. Cl. ..................................... 455/575.1
(58) Field of Classification Search .... 455/575.1–575.8; D14/132, 331, 138 AD
See application file for complete search history.

(56) References Cited

U.S. PATENT DOCUMENTS

| 6,552,909 B1* | 4/2003 | Liebenow | 361/725 |
| 2005/0049016 A1 | 3/2005 | Cho et al. | |
| 2007/0019389 A1* | 1/2007 | Du | 361/728 |

FOREIGN PATENT DOCUMENTS

| JP | 2006-086027 | 3/2006 |
| KR | 20-0355625 | 7/2004 |
| KR | 1020050013382 | 2/2005 |
| KR | 1020060022571 | 3/2006 |
| KR | 1020060117776 | 11/2006 |

* cited by examiner

*Primary Examiner* — Temesh Ghebretinsae
*Assistant Examiner* — David Bilodeau
(74) *Attorney, Agent, or Firm* — The Farrell Law Firm, P.C.

(57) ABSTRACT

A port cover opening/closing device for a portable terminal to open or close a plurality of port covers using a single cover dummy is disclosed. The device includes a cover opening; a first sliding cover and a second sliding cover slidably combined along the longitudinal direction of the cover opening to selectively open or close a first opening/closing space, and a second opening/closing space of the cover opening; a cover dummy provided between the first and second sliding covers, overlapping the first and second sliding covers when the first and second opening/closing spaces are opened respectively, and positioned parallel with the first and second sliding covers when the first and second opening/closing spaces are closed respectively; and an elastic member in the cover opening, providing an elastic force to the cover dummy.

10 Claims, 9 Drawing Sheets

PORT COVER OPENING/CLOSING DEVICE FOR PORTABLE TERMINAL

PRIORITY

This application claims priority under 35 U.S.C. §119(a) to a Korean Patent Application filed in the Korean Intellectual Property Office on Dec. 8, 2006 and assigned Serial No. 2006-124682, the entire disclosure of which is hereby incorporated by reference.

BACKGROUND OF THE INVENTION

1. Field of the Invention

The present invention generally relates to a port cover opening/closing device for a portable terminal. More particularly, the present invention relates to a port cover opening/closing device for a portable terminal, which is configured to open/close a plurality of port covers using a single cover dummy.

2. Description of the Related Art

In general, the term "portable terminal" refers to an electronic apparatus carried by a user to perform wireless communication. Conventional portable terminals may be classified into various types according to their appearance. For example, conventional portable terminals may be classified as bar-type portable terminals, flip-type portable terminals, and folder-type portable terminals. The bar-type portable terminal has a single housing shaped like a bar. The flip-type portable terminal has a flip which is pivotably mounted to a bar-shaped housing by a hinge device. The folder-type portable terminal has a folder coupled to a single bar-shaped housing by a hinge device to allow the folder to be rotated in order to be folded towards or unfolded away from the housing.

Further, portable terminals may be classified into neck wearable type terminals and wrist wearable type terminals according to the position in which a user carries the communication apparatus. The neck wearable type terminal is worn by a user around the neck using a string or lanyard, while the wrist wearable type terminal is worn by a user around the wrist.

Additionally, portable terminals may be further classified as rotation-type terminals and sliding-type terminals based upon the manner in which the portable terminals are opened or closed. In the rotation-type portable terminals, two housings are coupled to each other to allow one housing to rotate open or closed relative to the other while facing each other. In the sliding-type portable terminals, two housings are coupled to each other to allow one housing to slide along a direction to open or close the other housing. These variously classified portable terminals can be easily understood by those of ordinary skill in the art.

The portable terminal has ports for connection with other information devices such as Personal Computers (PCs) or peripheral devices. For example, the ports may be interface connectors for connection with Universal Serial Bus (USB) ports of PCs, travel chargers, or the like, or earphone plug for connection with earphones. Those ports are provided in the bottom face or side face of the terminal and are protected by rubber covers.

As illustrated in FIG. 1, a jack into which an earphone plug 5 is inserted is provided in the top face or side face of a portable terminal 1. When the earphone plug 5 is not inserted into the jack, a folding-type port cover 2 is provided to prevent foreign substances from entering the insider of a main body 1.

As illustrated in FIGS. 2 and 3, the conventional port cover 2 is made of urethane rubber and has a stopper 2a so as not to be separated from the main body 1 after being inserted into a mounting groove 3 of the main body 1. The port cover 2 also has a cylindrical portion 2b to close the inside of the main body 1 by being inserted into a through hole 4 formed in the main body 1, and a protrusion 2c that can be opened/closed upwardly and downwardly. In a jack 6a provided in a main board 6, an opening 6b is formed to be engaged with the earphone jack 5.

Moreover, the port cover 2 also has a hinge unit 2d having tension in order to allow its rotation.

The port cover 2 is opened/closed along the hinge unit 2d. Thus, the port cover 2 is inserted into the through hole 4 of the main body 1 in the non-used state of an earphone and the earphone jack 5 is combined with the jack 6a of the main board 6 and the port cover 2 is opened in the used state of the earphone.

However, the conventional folding-type port cover is made of rubber, and the rubber cover cannot have the same texture as that of a surrounding mold because it is made of a material different from the mold. Since most rubber covers are opened/closed by a user's nail, opening/closing operations may not be easy. Moreover, the cover may be damaged or broken by user's opening/closing operations, and the aesthetic appearance of the portable terminal is diminished when the cover is opened.

Furthermore, when an accessory like a charging cradle is mounted, it obstructs or interferes with the cover of the portable terminal, resulting in difficulty in opening/closing of the cover.

A port cover for a portable wireless terminal disclosed in U.S. patent application Ser. No. 10/923,401 (U.S. Patent Pub. No. 2005/0049016) is of a sliding type that is opened/closed in a sliding manner, and is assigned to the assignee of the present application.

A conventional sliding-type port cover opening/closing device includes a cover housing, a sliding cover for opening/closing a portion of the cover housing, a cover dummy positioned parallel with the sliding cover, and an elastic member.

However, when a removable memory and an earphone are arranged for the portable terminal, two port cover opening/closing devices are required, increasing an area occupied by a port cover and thus obstructing miniaturization and slimness of the portable terminal. Moreover, an increase in the number of parts makes the assembly process of the port cover difficult, raising the manufacturing cost of the port cover.

SUMMARY OF THE INVENTION

An aspect of exemplary embodiments of the present invention is to address at least the above problems and/or disadvantages and to provide at least the advantages described below. Accordingly, an aspect of the present invention is to provide a port cover opening/closing device for a portable terminal, which is designed to open/close a plurality of port covers using a single cover dummy in order to open/close the port covers selectively according to whether or not the port covers (earphone, memory, or the like) are used.

Moreover, another aspect of exemplary embodiments of the present invention provides a port cover opening/closing device for a portable terminal, in which a plurality of port covers slide bidirectionally with respect to a single cover dummy, thereby reducing a cover mounting space for miniaturization of the portable terminal and improving the exterior design of the portable terminal and the design of the port covers.

A further aspect of exemplary embodiments of the present invention provides a port cover opening/closing device for a portable terminal, in which a plurality of port covers are opened/closed using a single cover dummy, thereby reducing the number of cover assembly parts and thus making port cover assembly efficient.

Still another aspect of exemplary embodiments of the present invention provides a port cover opening/closing device for a portable terminal, in which a plurality of port covers are provided in a single place, thereby preventing an accessory such as a cradle from obstructing or interfering with the port covers.

In accordance with one aspect of exemplary embodiments of the present invention, there is provided a port cover opening/closing device for a portable terminal. The port cover opening/closing device includes a cover opening provided in a main body of the portable terminal; a first sliding cover; a second sliding cover slidably combined along the longitudinal direction of the cover opening in order to selectively open or close a first opening/closing space and a second opening/closing space of the cover opening; a cover dummy provided between the first sliding cover and the second sliding cover, the cover dummy overlapping the first sliding cover and the second sliding cover when the first opening/closing space and the second opening/closing space are opened, and positioned parallel with the first sliding cover and the second sliding cover when the first opening/closing space and the second opening/closing space are closed; and an elastic member disposed in the cover opening, the elastic member providing an elastic force for the cover dummy to overlap the first sliding cover and the second sliding cover or for disposing the cover dummy in parallel with the first sliding cover and the second sliding cover.

In accordance with another aspect of exemplary embodiments of the present invention, there is provided a port cover opening/closing device for a portable terminal. The port cover opening/closing device includes a cover opening; a plurality of sliding covers in the cover opening, the sliding covers slidably combined along the longitudinal direction of the cover opening in order to selectively open or close a plurality of opening/closing spaces of the cover opening; and a cover dummy in the cover opening, the cover dummy overlapping the sliding covers when the opening/closing spaces are opened and the cover dummy positioned parallel with the sliding covers when the opening/closing spaces are closed.

In accordance with a further aspect of exemplary embodiments of the present invention, there is provided a port cover opening/closing device for a portable terminal. The port cover opening/closing device includes a cover dummy in a cover opening and a plurality of sliding covers at both sides of the cover dummy and overlapping or positioned parallel with the cover dummy according to sliding in order to selectively open or close a plurality of opening/closing spaces provided in the cover opening.

BRIEF DESCRIPTION OF THE DRAWINGS

The above and other objects, features and advantages of exemplary embodiments of the present invention will be more apparent from the following detailed description taken in conjunction with the accompanying drawings, in which.

DETAILED DESCRIPTION OF THE EXEMPLARY EMBODIMENT

Figure 1:
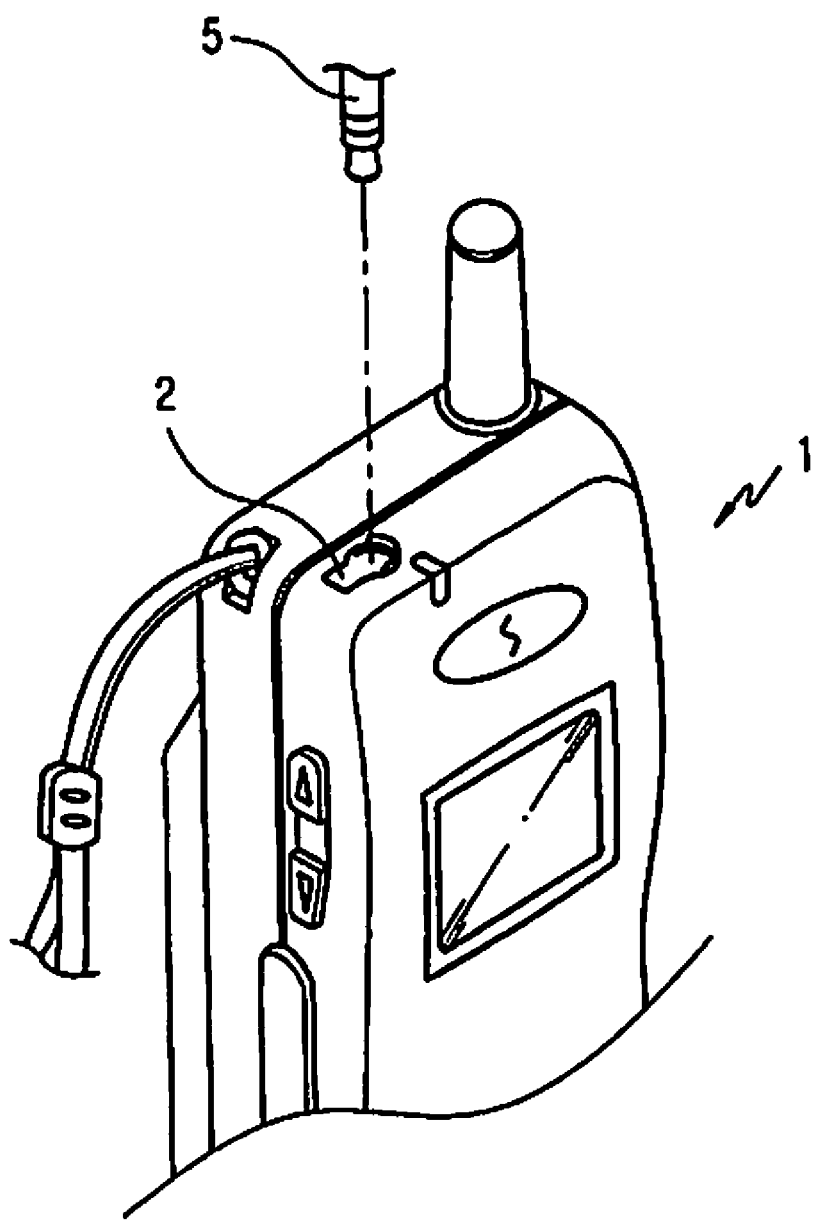
FIG. 1 is a perspective view showing the used state of a portable terminal in which a conventional folding-type earphone cover is mounted.
Figure 2:
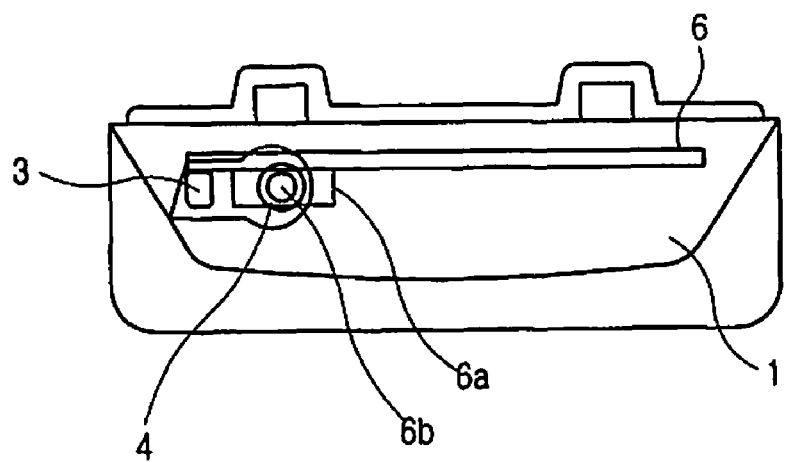
FIG. 2 is a cross-sectional view of a portable terminal in which a conventional folding-type earphone cover is mounted.
Figure 3:
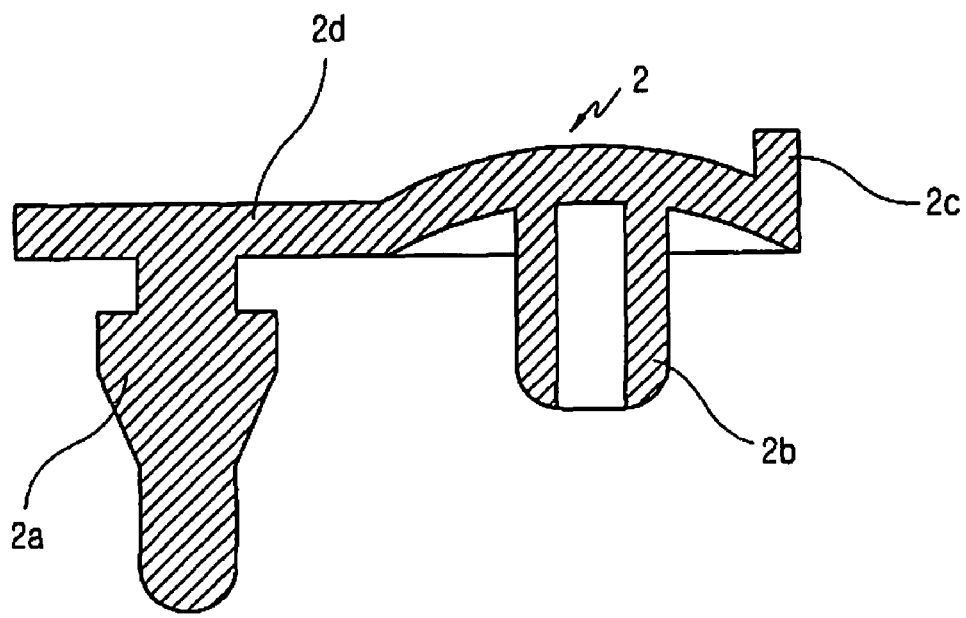
FIG. 3 is a side cross-sectional view of a conventional folding-type earphone cover.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

As illustrated in FIGS. 4 through 9, a port cover opening/closing device 10 for a portable terminal includes a cover opening 20, a first sliding cover 30, a second sliding cover 40, a cover dummy 50, and an elastic member 60. The cover opening 20 is provided in the main body 1 in order to accommodate the first sliding cover 30, the second sliding cover 40, the cover dummy 50, and the elastic member 60. The first sliding cover 30 and the second sliding cover 40 are provided in the cover opening 20 in such a manner as to slide along the longitudinal direction of the cover opening 20 so as to open or close a first opening/closing space 21 and a second opening/closing space 22 of the cover opening 20. The cover dummy 50 is disposed between the first sliding cover 30 and the second sliding cover 40. Thus, when the first opening/closing space 21 provided in the cover opening 20 is opened, the cover dummy 50 overlaps the first sliding cover 30, and the first sliding cover 30 and the second sliding cover 40 are adjacent to each other. When the second opening/closing space 22 is opened, the cover dummy 50 overlaps the second sliding cover 40 and the first sliding cover 30 and the second sliding cover 40 are adjacent to each other. The elastic member 60 is provided in the cover opening 20 in order to provide an elastic force to the cover dummy 50 in such a way that the first sliding cover 30 or the second sliding cover 40 overlaps or is adjacent to the cover dummy 50.

Figure 5:
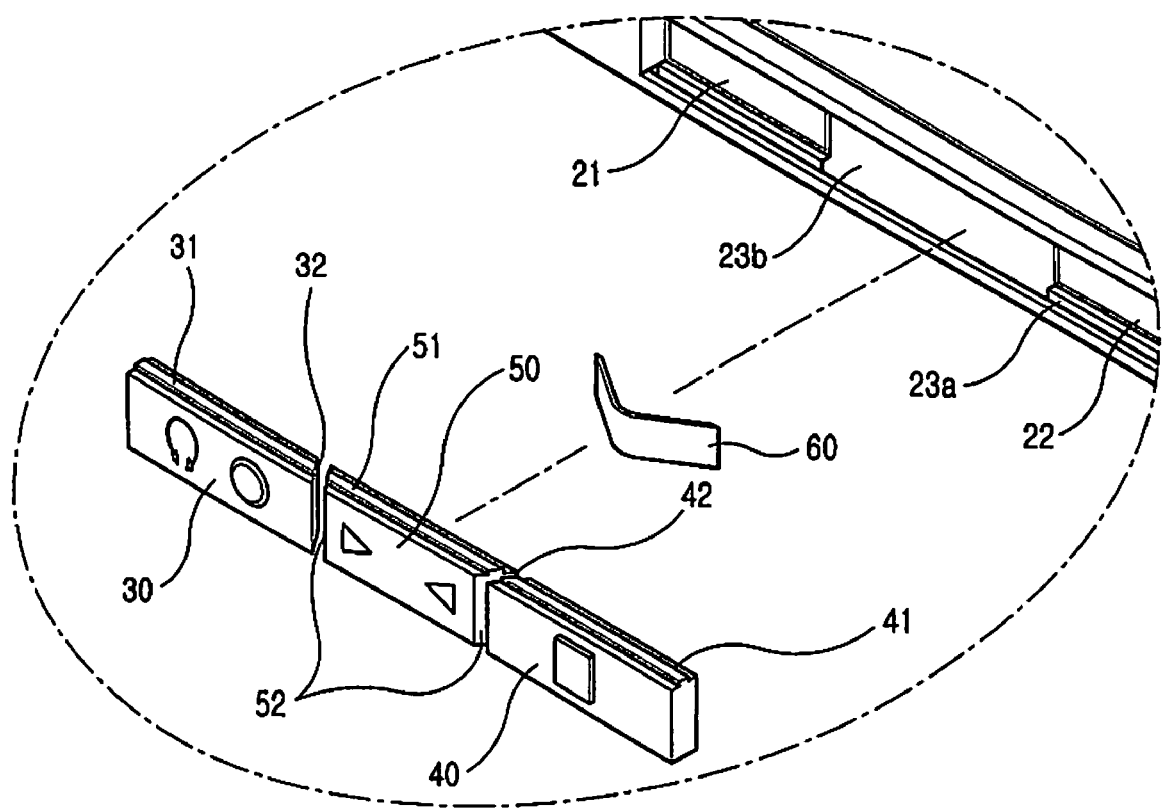
FIG. 5 is an enlarged exploded perspective view of a portion A illustrated in FIG. 4.
Figure 6:
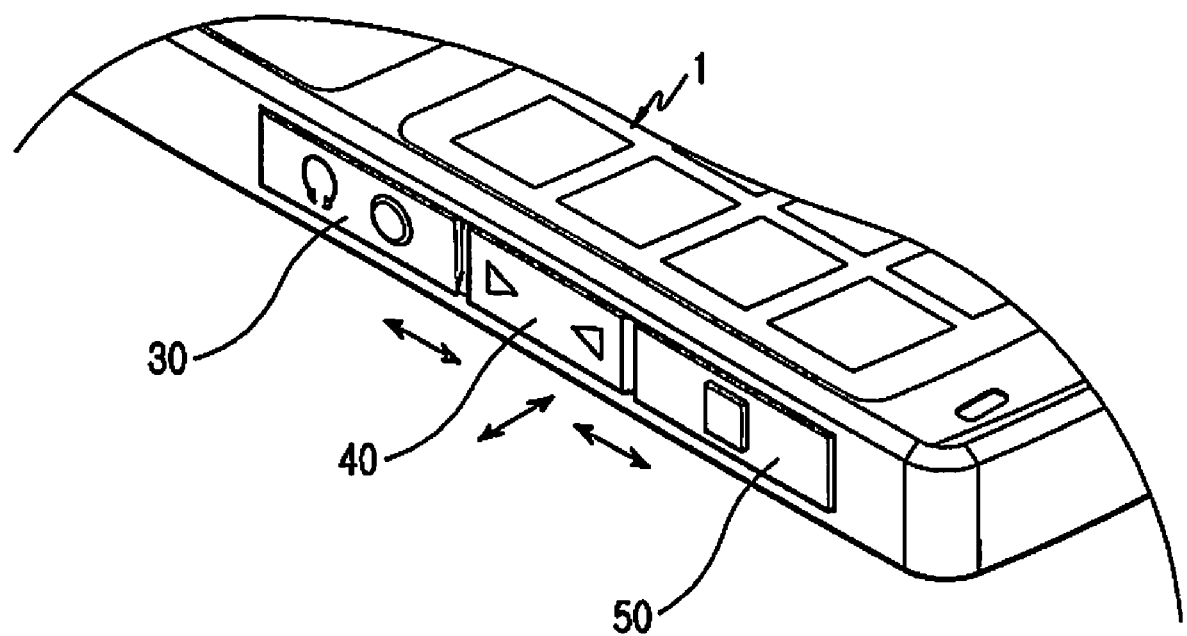
FIG. 6 is a perspective view showing a state in which a port cover opening/closing device for a portable terminal is provided in the portable terminal according to an exemplary embodiment of the present invention.

As illustrated in FIGS. 5 and 6, the first opening/closing space 21 has an earphone space including an earphone jack (not shown) and the second opening/closing space 22 has a memory space including a memory combining unit (not shown).

As illustrated in FIGS. 4, 5, 6, 10, and 11, a mounting groove 23 is formed in the cover opening 20 to allow mounting of the first sliding cover 30, the second sliding cover 40, the cover dummy 50, and the elastic member 60. A guide rail 23a is formed in the mounting groove 23 to guide sliding of the first sliding cover 30 and the second sliding cover 40. A moving space 23b is further formed in the mounting groove 23 to move the cover dummy 50 from a home position towards the inner side of the cover opening 20 or to return the cover dummy 50 to the home position.

As illustrated in FIGS. 5, 6, and 8 through 11, guide members 31 and 41 are formed in the outer edges of the first sliding cover 30 and the second sliding cover 41 for the first and second sliding covers 31 and 41 to be guided while being combined with the guide rail 23a, and cover guide slopes 32 and 42 are formed at a first inner end of the first sliding cover 30 and at a second inner end of the second sliding cover 40 to move along a dummy guide slope 52 formed in the cover dummy 50 while facing the dummy guide slope 52.

Figure 8:
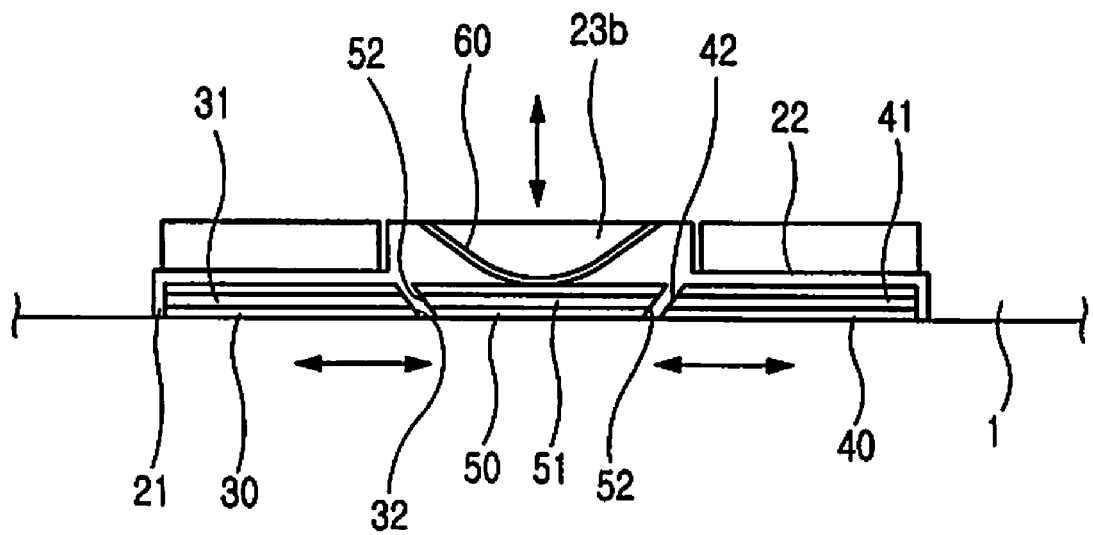
FIG. 8 is a cut plan view showing a state in which first and second sliding covers of a port cover opening/closing device according to an exemplary embodiment of the present invention are provided in a cover opening.
Figure 12:
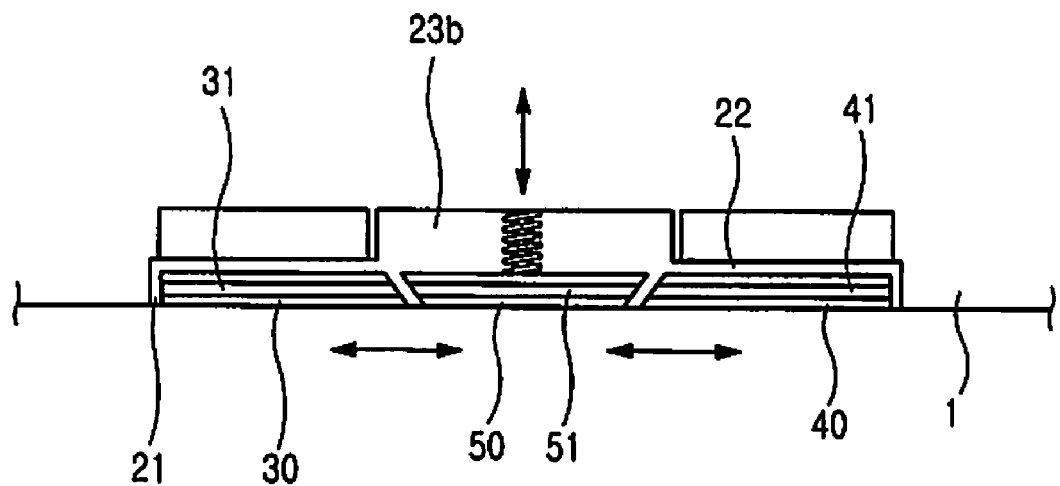
FIG. 12 is a cut plan view of an elastic member of a port cover opening/closing device according to another exemplary embodiment of the present invention.

As illustrated in FIGS. 8 and 12, the elastic member 60 is preferably made of a pan spring or a coil spring.

Hereinafter, the operation of the port cover opening/closing device for a portable terminal according to an exemplary embodiment of the present invention will be described in more detail with reference to FIGS. 4 through 12.

Figure 4:
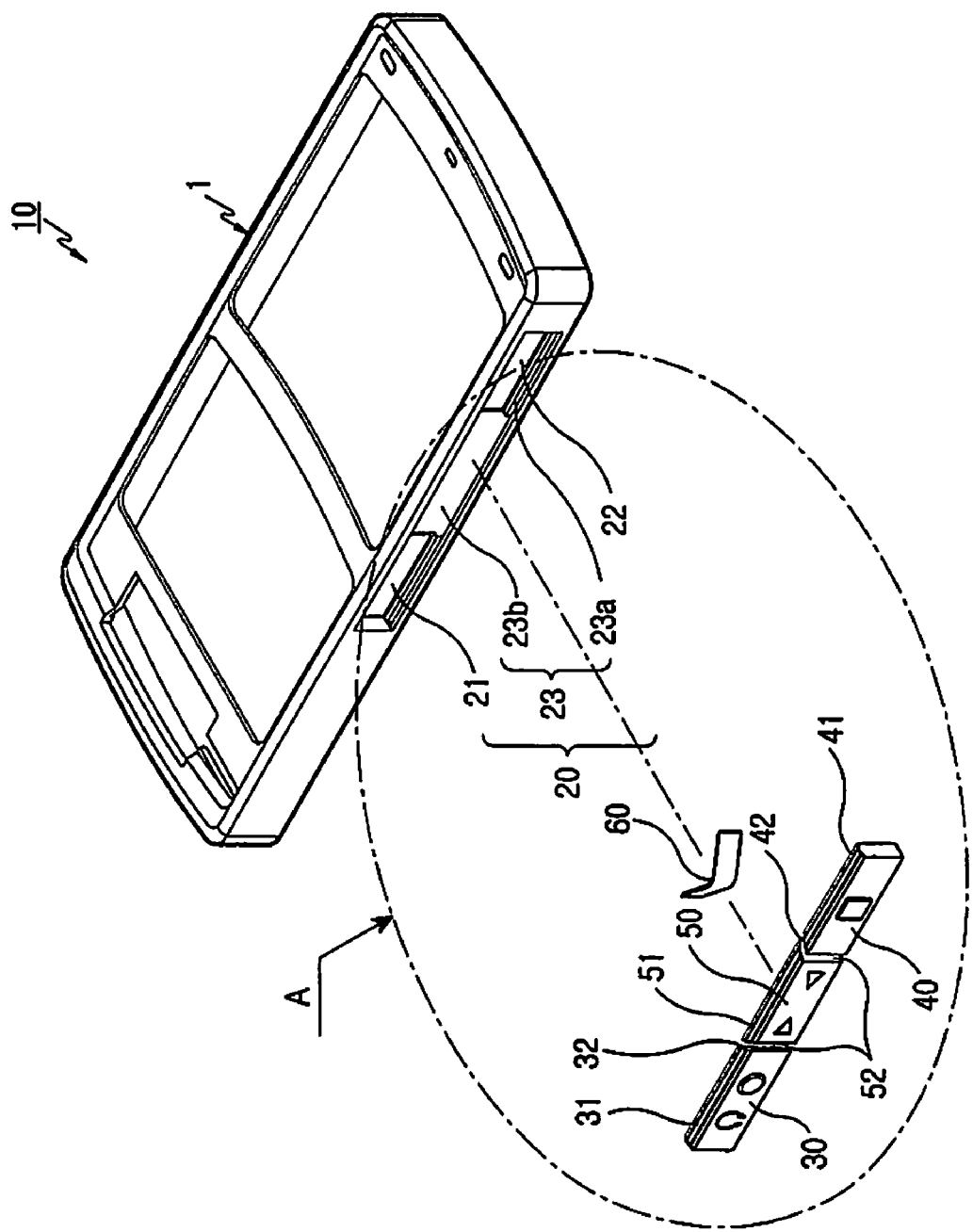
FIG. 4 is an exploded perspective view of a port cover opening/closing device for a portable terminal according to an exemplary embodiment of the present invention.

As illustrated in FIGS. 4 and 5, the port cover opening/closing device 10 for the portable terminal includes the cover opening 20, the first sliding cover 30, the second sliding cover 40, the cover dummy 50, and the elastic member 60. The first sliding cover 30, the second sliding cover 40, the cover dummy 50, and the elastic member 60 are sequentially combined with the mounting groove 23 formed in the cover opening 20.

As illustrated in FIG. 6, the first sliding cover 30 is provided at one end of the cover dummy 50 and the second sliding cover 40 is provided at the other end of the cover dummy 50. The dummy guide slope 52 formed in the cover dummy 50 and the cover guide slopes 32 and 42 formed in the first sliding cover 30 and the second sliding cover 40 face one another and are combined with the mounting groove 23. The first sliding cover 30 and the second sliding cover 40 are guidably combined with the guide rail 23a, and the cover dummy 50 is movably combined with the moving space 23b formed in the mounting groove 23. A guide rib 51 is formed in the cover dummy 50 for guiding the cover dummy 50 in such a manner as to overlap the cover dummy 50 with the first sliding cover 30 or the second sliding cover 40 according to sliding of the first sliding cover 30 or the second sliding cover 40 in the moving space 23b. The elastic member 60 is mounted in the moving space 23b to provide an elastic force for moving the cover dummy 50.

The elastic member 60 is preferably made of a pan spring.

Figure 7:
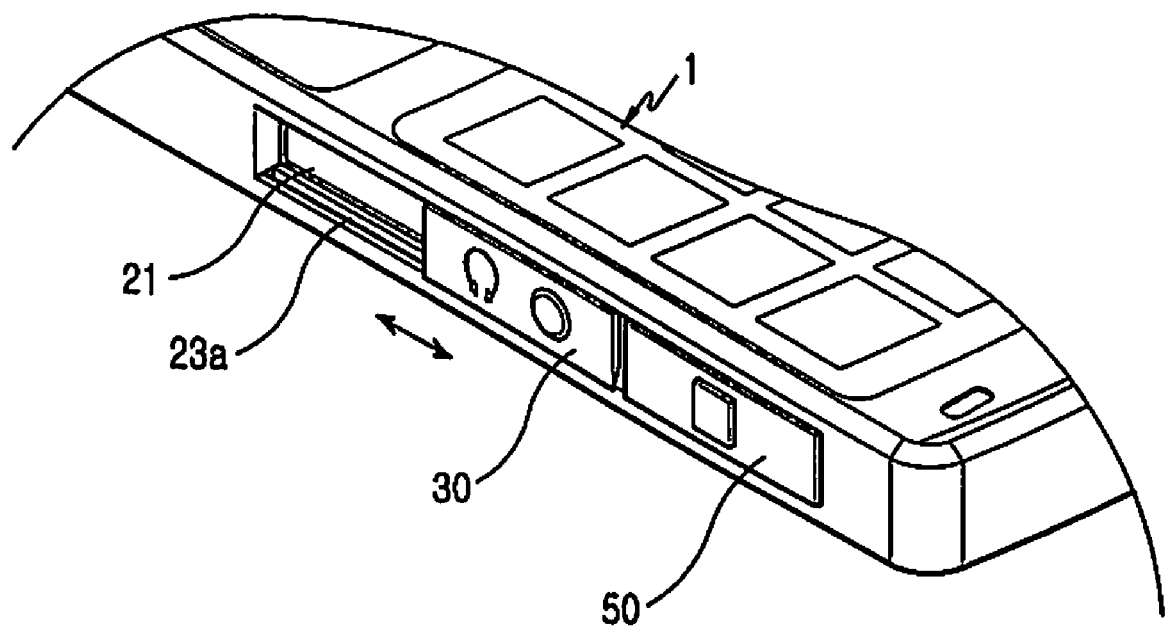
FIG. 7 is a perspective view showing the opened/closed state of a first sliding cover of a port cover opening/closing device according to an exemplary embodiment of the present invention.
Figure 9:
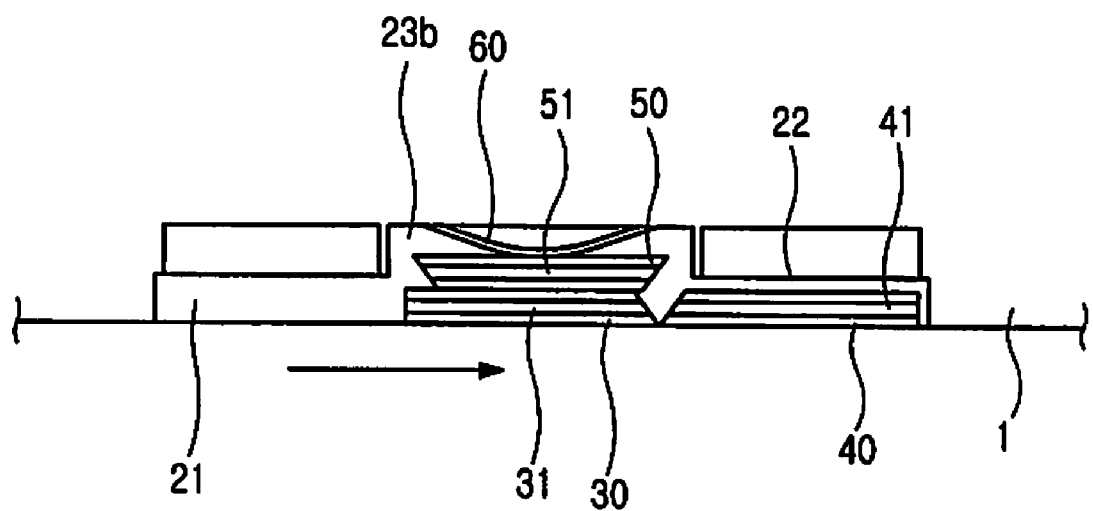
FIG. 9 is a cut plan view showing the opened/closed state of a first sliding cover of a port cover opening/closing device according to an exemplary embodiment of the present invention.

In this state, as illustrated in FIGS. 7 through 9, when connecting an earphone (not shown) to an earphone jack (not shown) of the portable terminal 1, a user slides the first sliding cover 30 towards the cover dummy 50. At this time, the cover guide slope 32 of the first sliding cover 30 is guided along the dummy guide slope 52 and the first sliding cover 30 overlaps the cover dummy 50.

As illustrated in FIG. 9, the cover dummy 50 moves towards the inner side of the moving space 23b and thus overlaps the first sliding cover 30. The first sliding cover 30 includes the guide member 31 in order to slide along the guide rail 23a formed in the mounting groove 23. Thus, once the first sliding cover 30 slides, the guide member 31 slides along the guide rail 23a.

At this time, the first opening/closing space 21 provided in the cover opening 20 is opened with the sliding of the first sliding cover 30. The first opening/closing space 21 provides the earphone space, including the earphone jack (not shown), and thus the earphone jack is exposed with the opening of the first opening/closing space 21.

In this state, the user connects a connection port (not shown) of the earphone (not shown) to the earphone jack (not shown).

Here, as illustrated in FIGS. 6 and 8, when the first opening/closing space 21 is closed, the guide member 31 of the first sliding cover 30 is turned on the home position along the guide rail 23a of the mounting groove 23 by sliding the first sliding cover 30 in the opposite direction. The cover dummy 50 is returned to the home position by moving in the moving space 23b and is positioned parallel with the first sliding cover 30.

At this time, the pan spring of the elastic member 60 provides an elastic force for movement of the cover dummy 50.

Figure 10:
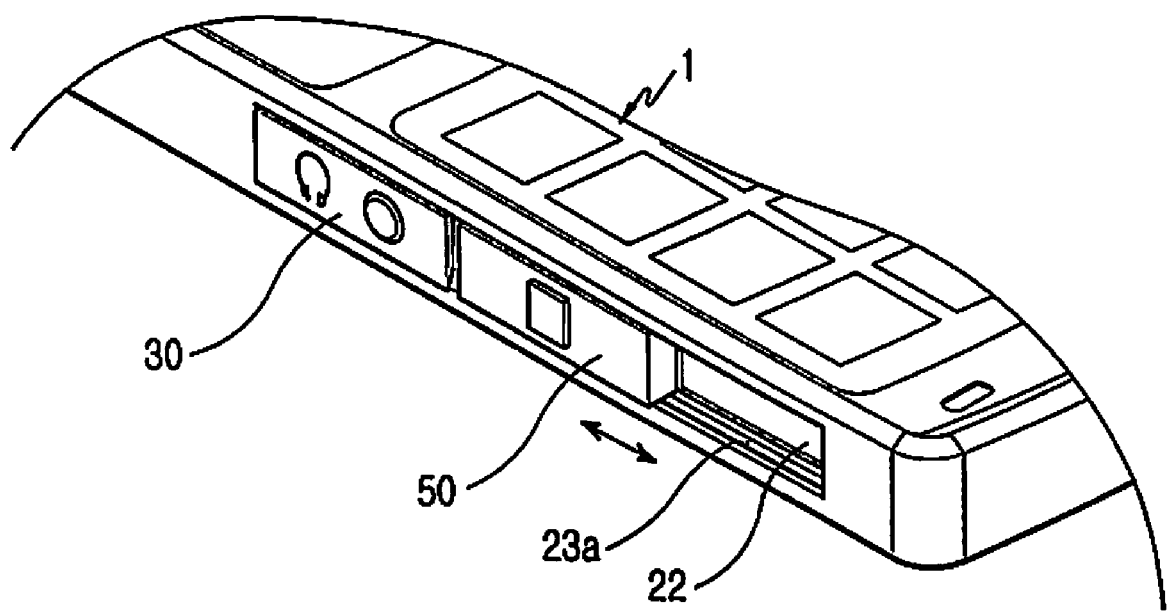
FIG. 10 is a perspective view showing the opened/closed state of a second sliding cover of a port cover opening/closing device according to an exemplary embodiment of the present invention.
Figure 11:
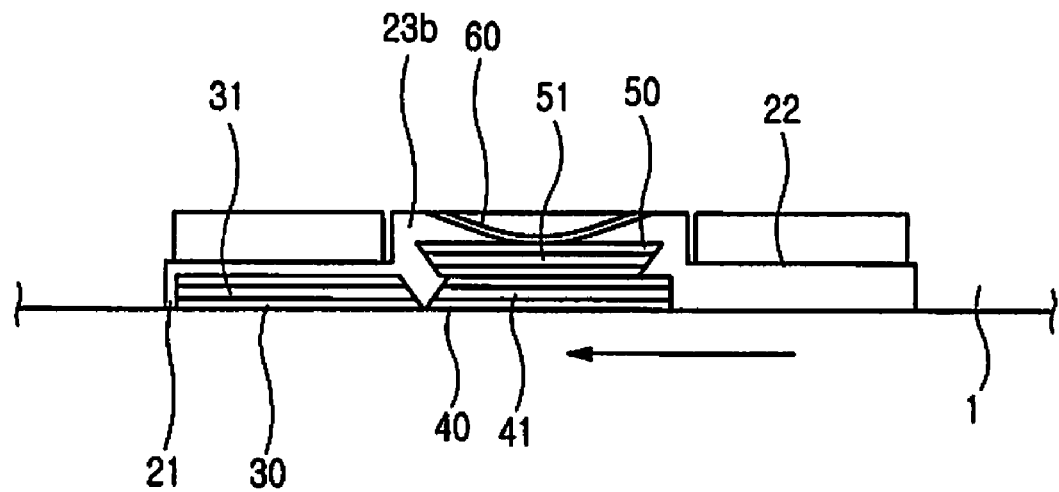
FIG. 11 is a cut plan view showing the opened/closed state of a second sliding cover of a port cover opening/closing device according to an exemplary embodiment of the present invention.

In this state, as illustrated in FIGS. 10 and 11, when combining the memory card (not shown) to the memory combining unit (not shown) provided in the portable terminal 1, the user slides the second sliding cover 40 towards the cover dummy 50. The cover guide slope 42 of the second sliding cover 40 is guided along the dummy guide slope 52, and the second sliding cover 40 overlaps the cover dummy 50.

The cover dummy 50 moves towards the inner side of the moving space 23b, and thus overlaps the second sliding cover 40.

As illustrated in FIG. 11, the second sliding cover 40 includes the guide member 41 in order to slide along the guide rail 23a formed in the mounting groove 23. Thus, once the second sliding cover 40 slides, the guide member 41 slides along the guide rail 23a.

At this time, the second opening/closing space 22 provided in the cover opening 20 is opened with the sliding of the second sliding cover 40. The second opening/closing space 22 provides the memory space, including the memory combining unit (not shown), and thus the memory combining unit (not shown) is exposed with the opening of the second opening/closing space 22.

In this state, the user combines the memory card (not shown) with the memory combining unit (not shown).

Here, as illustrated in FIGS. 6 and 8, when the second opening/closing space 22 is closed, the guide member 41 of the second sliding cover 40 is turned on the home position along the guide rail 23a of the mounting groove 23 by sliding the second sliding cover 40 in the opposite direction. The cover dummy 50 is returned to the home position by moving in the moving space 23b and is positioned parallel with the second sliding cover 40.

At this time, the pan spring of the elastic member 60 provides an elastic force for moving the cover dummy 50.

As illustrated in FIG. 12, according to another exemplary embodiment of the present invention, the elastic member 60 may be made of a coil spring.

As described above, according to the present invention, by opening/closing port covers, i.e., the first sliding cover 30 and the second sliding cover 40, using the single cover dummy 50 selectively according to whether or not the port covers (earphone or memory), are used, thereby reducing the number of parts and mounting space, thus miniaturizing the portable terminal and reducing a manufacturing cost, and improving the exterior design of the portable terminal and the design of the port covers.

While the invention has been shown and described with reference to an exemplary embodiment thereof, it will be understood by those skilled in the art that various changes in form and details may be made therein without departing from the spirit and scope of the invention.

What is claimed is:

1. A port cover opening/closing device for a portable terminal, the device comprising:
   a first opening/closing space and a second opening/closing space provided in a cover opening of a main body and on the same edge of the portable terminal;
   a first sliding cover and a second sliding cover, the sliding covers covering the first and second opening/closing space, respectively, wherein the first and second opening/closing spaces are separated and directly adjacent to a cover dummy, and wherein the first and second sliding covers slide towards each other causing them to overlap with the cover dummy when selectively opened;
   an elastic member disposed in the cover opening, the elastic member providing an elastic force to the cover dummy so that the cover dummy overlaps the first sliding cover and the second sliding cover when the first opening/closing space and the second opening/closing space are opened respectively.

2. The port cover opening/closing device of claim 1, wherein the first opening/closing space provides an earphone space including an earphone jack, and the second opening/closing space provides a memory space including a memory combining unit.

3. The port cover opening/closing device of claim 1, wherein a mounting groove is formed in the cover opening for mounting the first sliding cover, the second sliding cover, the cover dummy, and the elastic member.

4. The port cover opening/closing device of claim 3, wherein a guide rail is formed in the mounting groove to guide a sliding of the first sliding cover and the second sliding cover, and a moving space is formed in the mounting groove to move the cover dummy from a home position towards an inner side of the cover opening and to return the cover dummy to the home position.

5. The port cover opening/closing device of claim 4, wherein guide members are formed in outer edges of the first sliding cover and of the second sliding cover for guiding the first and second sliding covers while being combined with the guide rail, and cover guide slopes are formed at a first end of the first sliding cover and at a second end of the second sliding cover, the first and second ends facing the cover dummy.

6. The port cover opening/closing device of claim 5, wherein a guide rib is formed in the cover dummy for guiding the cover dummy so that the cover dummy overlaps the first sliding cover and the second sliding cover respectively according to a sliding of the first sliding cover and of the second sliding cover in the moving space, and a dummy guide slope is formed at both ends of the cover dummy, the both ends facing the first and second ends respectively.

7. The port cover opening/closing device of claim 1, wherein the first sliding cover is provided at one end of the cover dummy, the second sliding cover is provided at an other end of the cover dummy.

8. The port cover opening/closing device of claim 1, wherein the elastic member is made of one of a pan spring and a coil spring.

9. A port cover opening/closing device for a portable terminal, the device comprising:
   a cover opening; and
   a plurality of sliding covers provided in the cover opening, the sliding covers covering a plurality of opening/closing spaces of the cover opening provided in the cover opening of a main body and on the same edge of the portable terminal,
   wherein the plurality of opening/closing spaces are separated and directly adjacent to a cover dummy, the cover dummy provided in the cover opening and overlapping the sliding covers when the opening/closing spaces are opened and the cover dummy positioned parallel with the sliding covers when the opening/closing spaces are closed, and
   wherein the plurality of sliding covers slide towards each other causing them to overlap with the cover dummy when selectively opened.

10. A port cover opening/closing device for a portable terminal, the device comprising:
    a cover dummy provided in a cover opening; and
    a plurality of sliding covers disposed at both sides of the cover dummy, the sliding covers covering a plurality of opening/closing spaces provided in the cover opening,
    wherein the plurality of opening/closing spaces are separated and directly adjacent to the cover dummy on the same edge of the portable terminal, and
    wherein the plurality of sliding covers slide towards each other causing them to overlap with the cover dummy when selectively opened.

* * * * *